(12) United States Patent
Thomson (10) Patent No.: US 12,122,128 B2
(45) Date of Patent: Oct. 22, 2024

(54) ADHESIVE-FREE FABRIC OR FLEXIBLE COMPOSITE MATERIAL FOR INFLATABLE SAFETY PRODUCTS

(71) Applicant: Air Cruisers Company, LLC, Wall Township, NJ (US)

(72) Inventor: Christian Thomson, Wall Township, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 0 days.

(21) Appl. No.: 18/086,947

(22) Filed: Dec. 22, 2022

(65) Prior Publication Data

US 2024/0208190 A1 Jun. 27, 2024

(51) Int. Cl.
| | |
|---|---|
| *B32B 27/08* | (2006.01) |
| *B32B 5/02* | (2006.01) |
| *B32B 7/027* | (2019.01) |
| *B32B 15/04* | (2006.01) |
| *B32B 15/18* | (2006.01) |

(Continued)

(52) U.S. Cl.
CPC ............ *B32B 27/12* (2013.01); *B32B 5/02* (2013.01); *B32B 7/027* (2019.01); *B32B 15/04* (2013.01); *B32B 15/18* (2013.01); *B32B 15/20* (2013.01); *B32B 27/08* (2013.01); *B32B 27/32* (2013.01); *B32B 27/34* (2013.01); *B32B 27/36* (2013.01); *B63C 9/04* (2013.01); *B63C 9/1255* (2013.01); *B64D 25/14* (2013.01); *B32B 2307/306* (2013.01); *B32B 2307/54* (2013.01); *B32B 2307/718* (2013.01); *B32B 2437/00* (2013.01);

(Continued)

(58) Field of Classification Search
None
See application file for complete search history.

(56) References Cited

U.S. PATENT DOCUMENTS

| 6,455,449 B1 | 9/2002 | Veiga et al. |
| 11,432,605 B1 * | 9/2022 | Eleazer .................. B32B 27/12 |

(Continued)

FOREIGN PATENT DOCUMENTS

| EP | 3121329 A1 * | 1/2017 | ............. B64D 25/14 |
| EP | 4101643 A1 | 12/2022 | |

(Continued)

OTHER PUBLICATIONS

Kiron, "Metal Fiber Types, Characteristics, Uses, Advantages, and Disadvantages", Sep. 17, 2021 and available online at least by Sep. 18, 2021 as dated by web.archive.org, Textile Learner, accessed online Oct. 26, 2023 at textilelearner.net/metallic-fiber-types-properties (Year: 2021).*

(Continued)

*Primary Examiner* — Kim S. Horger
(74) *Attorney, Agent, or Firm* — Kilpatrick Townsend & Stockton LLP (57) ABSTRACT

Described is a fabric or flexible composite material for an inflatable safety product. The fabric or flexible composite material includes a substrate and a film covering a surface of the substrate. In certain embodiments, the substrate and the film have a same base polymer. The film may be fused to the substrate without an adhesive. A method of forming an inflatable safety product includes forming a fabric or flexible composite material by fusing a film to a substrate without an adhesive.

23 Claims, 3 Drawing Sheets

(51) Int. Cl.
*B32B 15/20* (2006.01)
*B32B 27/12* (2006.01)
*B32B 27/32* (2006.01)
*B32B 27/34* (2006.01)
*B32B 27/36* (2006.01)
*B63C 9/04* (2006.01)
*B63C 9/125* (2006.01)
*B64D 25/14* (2006.01)

(52) U.S. Cl.
CPC ....... *B32B 2439/00* (2013.01); *B32B 2607/00* (2013.01); *B63C 2009/042* (2013.01)

(56) References Cited

U.S. PATENT DOCUMENTS

| | | |
|---|---|---|
| 2002/0041941 A1 | 4/2002 | Ritter |
| 2010/0295278 A1* | 11/2010 | Hamels ................. B60R 21/201 |
| | | 280/729 |
| 2013/0171389 A1 | 7/2013 | Kanai et al. |
| 2018/0281738 A1* | 10/2018 | Otsuka ................ B60R 21/2171 |
| 2021/0016550 A1 | 1/2021 | Lindemann et al. |
| 2022/0089290 A1 | 3/2022 | Kuppan et al. |
| 2022/0153422 A1* | 5/2022 | Govindaraju ............ D06N 3/14 |

FOREIGN PATENT DOCUMENTS

| | | |
|---|---|---|
| KR | 20210086892 A | 7/2021 |
| WO | 2022039814 A2 | 2/2022 |

OTHER PUBLICATIONS

Sepe, "Density & Molecular Weight in Polyethylene", May 29, 2012, Plastics Technology, accessed online Apr. 26, 2024 at www.ptonline.com/articles/density-molecular-weight-in-polyethylene (Year: 2012).*

International Application No. PCT/US2023/084674, International Search Report and Written Opinion, mailed on Apr. 8, 2024, 18 pages.

* cited by examiner

ADHESIVE-FREE FABRIC OR FLEXIBLE COMPOSITE MATERIAL FOR INFLATABLE SAFETY PRODUCTS

FIELD OF THE INVENTION

The field of the invention relates to air-holding and component or accessory fabrics or flexible composite materials, and, more particularly, to fabrics or flexible composite materials for an inflatable safety product.

BACKGROUND

Federal aviation safety regulations require aircraft to provide evacuation and other safety provisions for passengers. These include evacuation slides, evacuation slide/rafts, ramps, slide/ramps, life rafts, life vests, helicopter floats and other life-saving inflatable devices. Relevant inflatable products that can be improved using the fabrics or flexible composite materials of the present disclosure can include evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or safety device requiring rapid inflation and/or secure air-holding functions or gas-holding functions. These inflatable devices are generally built from an assembly of inflatable tubular structures that form air beams that are sealed to one another. Inflatable escape slides and life rafts also have non-air-holding features, such as floors, sliding surfaces, girts, patches, handles, pouches, containers, structural attachments, accessories, components, and other features.

Typically, in order to form the tubular structures, many pieces of fabric or flexible composite material (which may be referred to herein as panels) are joined together. Safety regulations set strength requirements for the fabric or flexible composite material itself (the field of the inflatable tube), as well as strength requirements for the seam areas. In certain embodiments, the tubular structures may be substantially leak proof when inflated to keep the inflation gas inside the tubes for long durations.

Conventional fabrics or flexible composite material for inflatable safety products utilize polyamide substrates that are coated with solvent-based polyurethane coatings on opposing surfaces of the substrate. The solvent-based polyurethane coating on the outside surface of the substrate provides abrasion resistance, heat resistance, and the means to adhere seam tapes, components, accessories, and/or other fabrics to the outside surface of the fabric. The solvent-based polyurethane coating on the inside surface of the substrate provides a gas barrier layer to the substrate to create an air-holding or gas-holding fabric. Such conventional solvent-based polyurethane coatings require complex manufacturing processes with long production cycle times, long cure times, and high labor costs and generally have negative environmental impacts that pose risks to the health and safety of the workplace. Conventional fabrics or flexible composite material with solvent-based polyurethane coatings are also generally heavy, thereby taking up weight on vehicles with weight restrictions such as aircraft.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a fabric or flexible composite material for an inflatable safety product includes a substrate and a film covering a surface of the substrate, wherein the substrate and the film comprise a same base polymer.

According to certain embodiments of the present invention, a fabric or flexible composite material for an inflatable safety product, the fabric or flexible composite material comprising a substrate and a film covering a surface of the substrate, wherein the film is fused to the substrate without an adhesive.

According to certain embodiments of the present invention, a method of forming an inflatable safety product, the method comprising forming a fabric or flexible composite material by fusing a film to a substrate without an adhesive.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein are fabrics or flexible composite materials for inflatable safety products that include a substrate and a film having the same base polymer and/or that are adhesive-free. While the fabrics or flexible composite materials are discussed for use with inflatable safety products such as evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air-holding functions or gas-holding functions, they are by no means so limited. Rather, embodiments of the fabrics or flexible composite materials may be used in fabric related applications of any type of inflatable safety product or otherwise as desired.

In various embodiments, the fabric or flexible composite materials described herein are utilized on inflatable safety equipment that is typically deflated, folded, and compressed to fit into confined areas on aircraft doors, within an aircraft fuselage, or in an aircraft storage compartment, thereby taking up space or volume on vehicles with volume restrictions such as aircraft.

In certain embodiments, the fabrics or flexible composite materials described herein may be environmentally friendly compared to traditional fabrics or flexible composite materials while still maintaining seam adhesion and gas barrier properties when exposed to a heat source, aging, and/or fluids exposure. In some embodiments, the fabrics or flexible composite materials described herein may have a reduced weight compared to traditional fabrics or flexible composite materials. As non-limiting examples, the fabrics or flexible composite materials may have a weight less than 8 ounces/yd$^2$, such as less than 6 ounces/yd$^2$, such as less than 5 ounces/yd$^2$, such as less than 4 ounces/yd$^2$, such as less than 3 ounces/yd$^2$, such as less than 2 ounces/yd$^2$, such as less than 1 ounce/yd$^2$, such as less than 0.5 ounces/yd$^2$. The fabrics or flexible composite materials described herein may also have improved manufacturing compared to the manufacturing processes of traditional fabrics or flexible composite materials. In some embodiments, the fabrics or flexible composite materials described herein may have an emissivity of 0.48 or less, such as 0.25 while maintaining seam adhesion and gas barrier properties. An emissivity of 0 would mean that the fabric or flexible composite material reflects all heat, and a temperature of the fabric or flexible composite material would not significantly change when exposed to radiant heat. Conversely, an emissivity of 1 would mean that the fabric or flexible composite material is a perfect absorber, and all the heat would be absorbed. In some embodiments, the fabrics or flexible composite materials described herein may not require time to cure after being manufactured. Various other advantages and benefits may be realized with the systems and methods described herein, and the aforementioned benefits should not be considered limiting.

Figure 1:
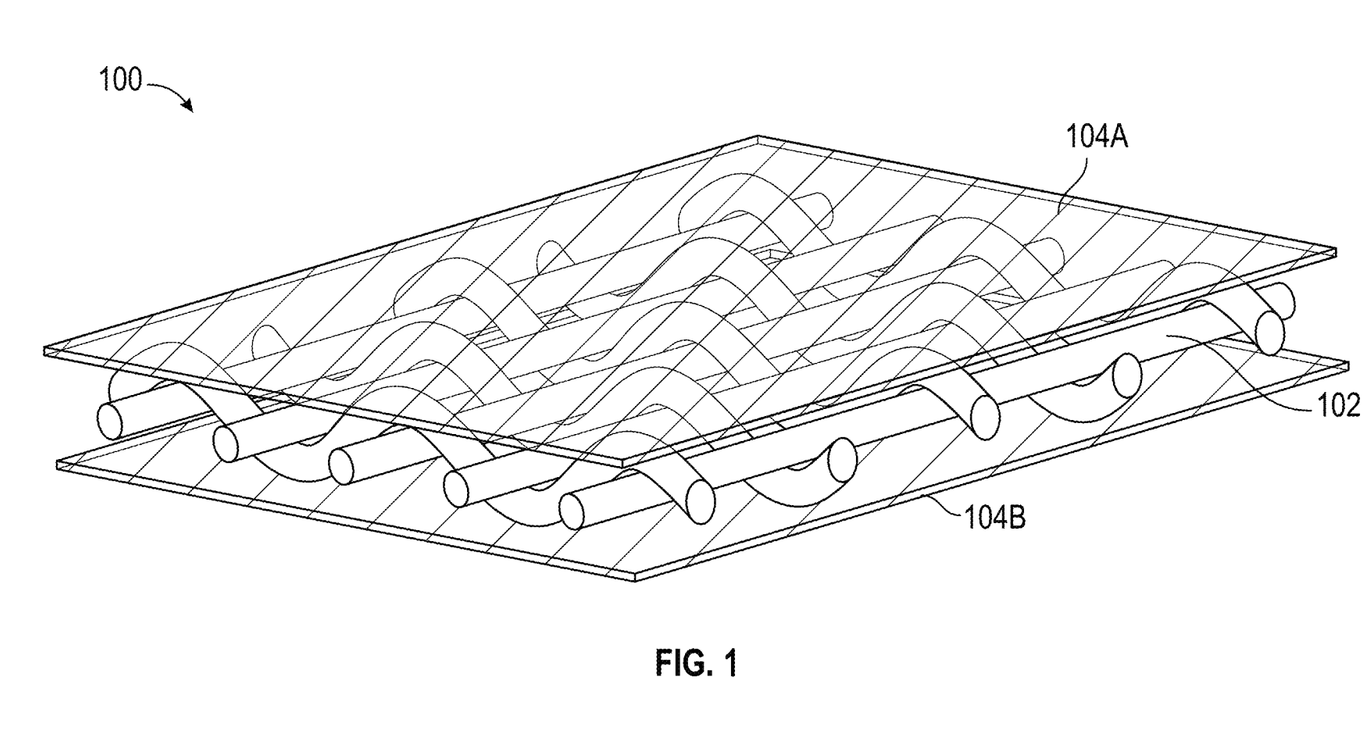
FIG. 1 is a cross-sectional view of a fabric or flexible composite material for an inflatable safety product according to certain embodiments of the present invention, the fabric or flexible composite material including a substrate and a film at least partially covering a surface of the substrate.

FIG. 1 illustrates an example of a portion of a fabric or flexible composite material 100 for an inflatable safety product according to embodiments. The fabric or flexible composite material 100 may be provided at various locations and/or form various portions of an inflatable safety product, optionally with different functionalities. As non-limiting examples, the fabric or flexible composite material 100 may be a gas-holding fabric or flexible composite material, a seam tape fabric or flexible composite material, a floor fabric or flexible composite material, a sliding surface fabric or flexible composite material, a girt fabric or flexible composite material, a patch fabric or flexible composite material, a handle fabric or flexible composite material, a pouch fabric or flexible composite material, a container fabric or flexible composite material, a structural attachment fabric or flexible composite material, an accessory fabric or flexible composite material, a component fabric or flexible composite material, or the like. Non-limiting examples of inflatable safety products with the fabric or flexible composite material 100 include, but are not limited to, an inflatable evacuation slide, inflatable evacuation slide/raft, inflatable evacuation ramp, inflatable evacuation slide/ramp, an inflatable life raft, an inflatable life vest, and/or an inflatable helicopter float, among others.

In certain embodiments, the fabric or flexible composite material 100 may have a weight of less than or approximately 8 ounces/yd$^2$. In some embodiments, the weight of the fabric or flexible composite material 100 is less than or approximately 6 ounces/yd$^2$, such as less than 5 ounces/yd$^2$. I some embodiments, the weight of the fabric or flexible composite material 100 is less than or approximately 4 ounces/yd$^2$. In some embodiments, the weight of the fabric or flexible composite material 100 is less than or approximately 3 ounces/yd$^2$. In some embodiments, the weight of the fabric or flexible composite material 100 is less than or approximately 2 ounces/yd$^2$. In some embodiments, the weight of the fabric or flexible composite material 100 is less than or approximately 1 ounce/yd$^2$. In some embodiments, the weight of the fabric or flexible composite material 100 is less than or approximately 0.5 ounces/yd$^2$.

As illustrated in FIG. 1, the fabric or flexible composite material 100 generally includes a substrate 102 and at least one film layer 104 covering at least a portion of a surface of the substrate 102. In the embodiment illustrated, the fabric or flexible composite material 100 includes a first film layer 104A at least partially covering an outer surface of the substrate 102. In this example, the first film layer 104A may be an outer film of the fabric or flexible composite material 100. The fabric or flexible composite material 100 also includes a second film layer 104B at least partially covering an inner surface of the substrate 102, and the second film layer 104B may be an inner film of the fabric or flexible composite material 100.

However, the number and location of the film layers 104 relative to the substrate 102 should not be considered limiting. As a non-limiting examples, a single film layer 104 may be provide (e.g., just the film layer 104A), and/or a plurality of film layers 104 may be provided on a single side (e.g., the outer side) of the substrate 102, and at least one of the plurality of films 104 may at least partially cover the surface of the substrate 102. As a further non-limiting example, the film layer 104 may not completely cover the surface of the substrate 102 on which it is positioned.

Figure 2:
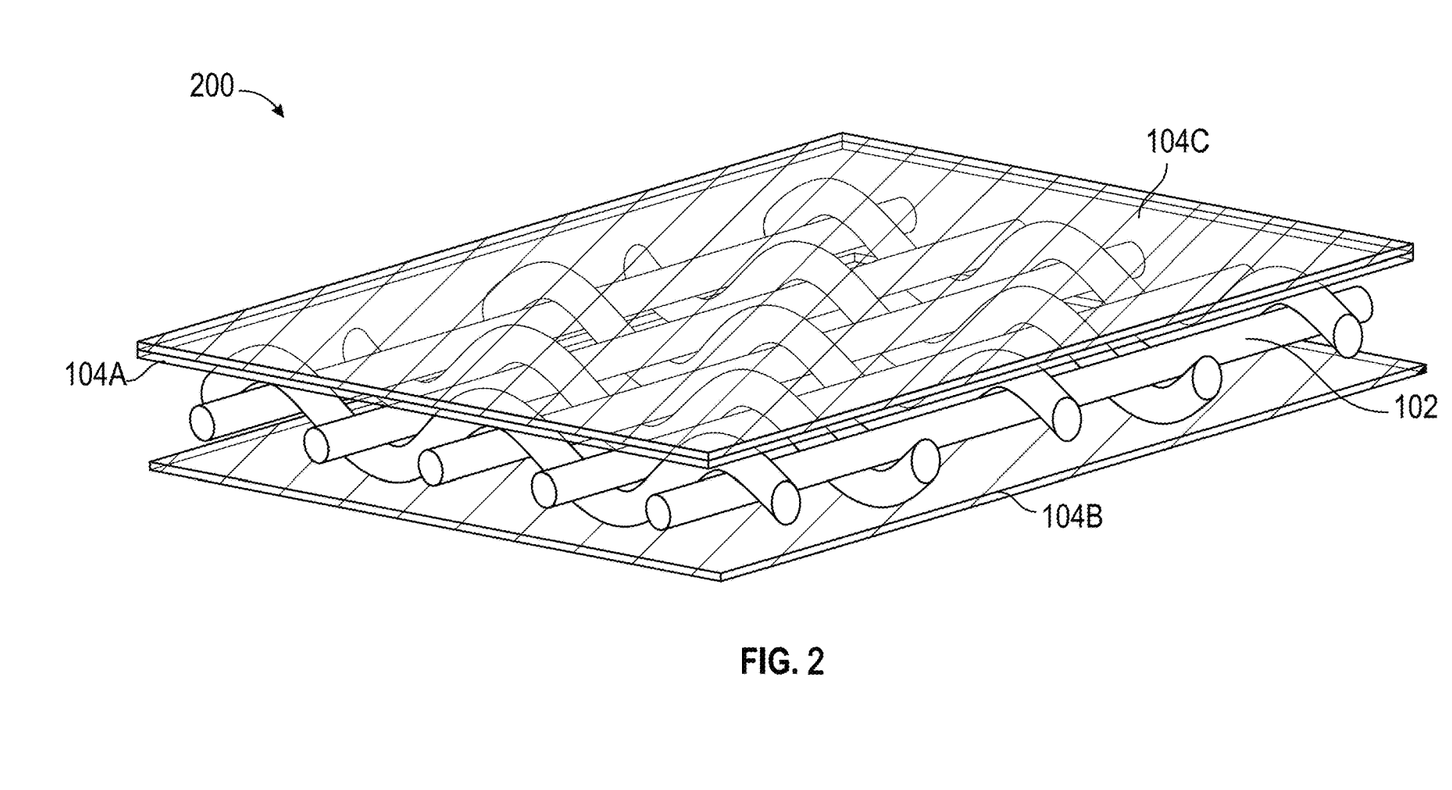
FIG. 2 is a cross-sectional view of a fabric or flexible composite material for an inflatable safety product according to certain embodiments of the present invention, the fabric or flexible composite material including a substrate and a plurality of films with one film at least partially covering a surface of the substrate.

When provided on the outer surface of the substrate 102, the at least one film layer 104 may provide abrasion resistance and the means to adhere films, seam tapes, components, accessories, and/or other fabrics or flexible composite materials to the outer surface of the substrate 102. When provided on the inner surface of the substrate 102, the at least one film layer 104 may function as a gas barrier to create air-holding or gas-holding fabric properties. Optionally, a plurality of film layers 104 are adhered to the substrate 102 to improve abrasion resistance, radiant heat resistance, and/or gas-holding properties of the fabric or flexible composite material 100. As a non-limiting example, FIG. 2 illustrates a fabric or flexible composite material 200 that is substantially similar to the fabric or flexible composite material 100 except that the fabric or flexible composite material 200 includes three film layers 104A-C, of which film layers 104A and 104C are on an outer side of the substrate 102. In this example, the film layer 104C is an outer film and the film layer 104B is an inner film of the fabric or flexible composite material 200.

In various embodiments, and unlike traditional fabric or flexible composite materials, the substrate 102 and the at least one film layer 104 of the fabric or flexible composite material 100 are materials with a same base polymer. Examples of base polymers include, but are not limited to polyethylene, ultra-high molecular weight polyethylene, polypropylene, polyester, polyamide, aromatic polyamide, aramid, polyolefin, aromatic polyester, polyarylate, other liquid crystal polymers, or nylon. As non-limiting examples, the substrate 102 may include polyethylene, ultra-high molecular weight polyethylene, polypropylene, polyester, polyamide, aromatic polyamide, aramid, polyolefin, aromatic polyester, polyarylate, other liquid crystal polymers, or nylon, other suitable substrate material, or any combination thereof. As additional non-limiting examples, the substrate 102 may be a material such as but not limited to those sold under the trade names Dyneema®, Spectra®, Innegra®, Vectran®, Nylon-6, Nylon 6-6, Nylon 4-6, Nylon 11, Nylon 12, Kevlar®, or Technora®. In one non-limiting example, the same base polymer for the substrate 102 and the at least one film layer 104 is polyethylene. In one non-limiting example, the substrate 102 is a polyethylene substrate, such as but not limited to an ultra-high molecular weight polyethylene substrate. In one non-limiting example, the substrate 102 is a polyamide, such as but not limited to a Nylon 6-6 substrate. In certain embodiments, substrate 102 may have a weight of less than or approximately 4.5 ounces/yd$^2$, such as less than or approximately 3.5 ounces/yd$^2$, such as less than or approximately 3.0 ounces/yd$^2$, such as less than or approximately 2.5 ounces/yd$^2$, such as less than or approximately 2.0 ounces/yd$^2$, such as less than or approximately 1.5 ounces/yd$^2$, such as less than or approximately 1.0 ounce/yd$^2$, such as less than or approximately 0.5 ounces/yd$^2$.

In certain embodiments, while the substrate 102 and film layer(s) 104 have a same base polymer, the material of the substrate 102 may have a melting temperature that is different from the melting temperature of the film layer(s) 104. In one non-limiting example, the melting temperature of the at least one film layer 104 that at least partially covers a surface of the substrate 102 is less than the melting temperature of the substrate 102, although it need not be in other embodiments. Optionally, the at least one film layer 104 has a melting temperature less than that of a polyamide, such as a melting temperature less than 500° F., such as a melting temperature less than 450° F., such as a melting temperature less than 400° F., such as a melting temperature less than 350° F., such a melting temperature less than 300° F. In one non-limiting example a Nylon 6-6 substrate has a melting point of 514° F. and a Nylon 12 film has a melting point of 257° F. In another non-limiting example, an ultra-high molecular weight polyethylene substrate has a melting point of 297° F. and a low-density polyethylene film has a melting point of 239° F.

The substrate 102 and the at least one film layer 104 having the same base polymer allow for the at least one film layer 104 to be fused to the substrate 102 to form the inflatable safety product without requiring an adhesive therebetween. As such, the fabric or flexible composite material 100 with the substrate 102 and at least one film layer 104 having the same based polymer may be an adhesive-free fabric or flexible composite material. The at least one film layer 104 may be adhered to the substrate 102 using only heat and pressure because the same base polymer is used, and traditional adhesives requiring long cure times are omitted. The fabric or flexible composite material 100 with the substrate 102 and the at least one film layer 104 having the same base polymer may also allow for the fabric or flexible composite material 100 to have a longer shelf life compared to traditional fabric or flexible composite materials.

Figure 3:
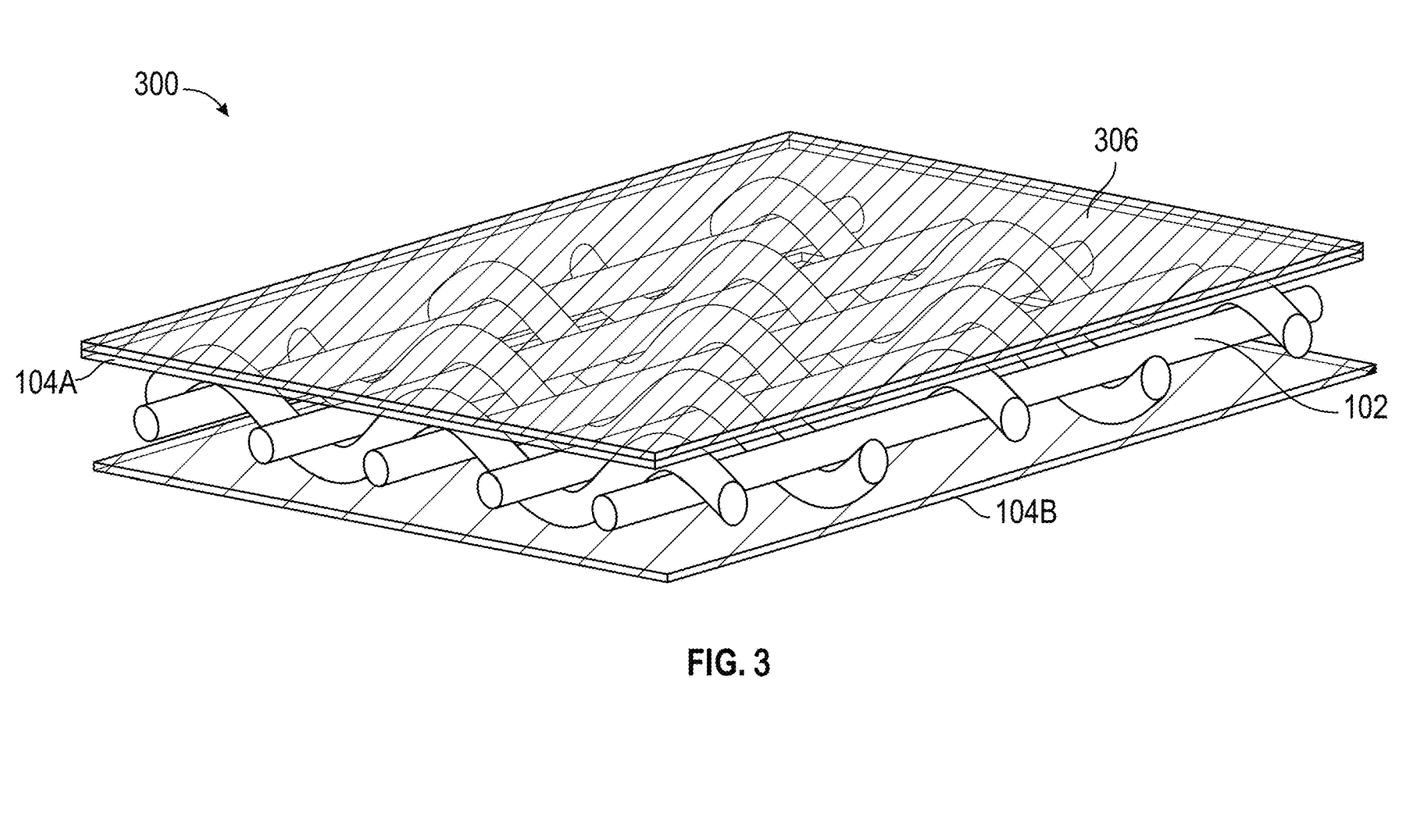
FIG. 3 is a cross-sectional view of a fabric or flexible composite material for an inflatable safety product according to certain embodiments of the present invention, the fabric or flexible composite material including a substrate, a film at least partially covering a surface of the substrate, and a metallic layer.

Optionally, a fabric or flexible composite material may include a metallic layer to decrease the emissivity of the fabric or flexible composite material and to improve the radiant heat resistance of the fabric or flexible composite material. The metallic layer may be a separate layer adhered to one of the film layers 104, and/or one of the film layers 104 may be metallized. FIG. 3 illustrates an example of a fabric or flexible composite material 300 that is substantially similar to the fabric or flexible composite material 100 except that the fabric or flexible composite material 300 includes a metallic layer 306 adhered to the film layer 104A.

The metallic layer 306 may include various metals or metallic elements as desired, including but not limited to aluminum, aluminum alloys, titanium, titanium alloys, nickel, nickel alloys brass, brass alloys, steel, steel alloys, stainless steel, stainless steel alloy, silver, silver alloy, combinations thereof, and/or any other suitable metal or metallic elements as desired. The metallic layer 306 may be completely covering or discontinuous on the substrate 102 or film layer(s) 104 as desired. In various embodiments, the metallic layer 306 may be provided as a discrete pattern on the substrate 102 or film layer(s) 104. In other embodiments, the metallic layer 306 need not form a pattern, and/or the metallic layer 306 may be provided as a plurality of discrete patterns (that may be connected with each other and/or disconnected).

The metallic layer 306 may be deposited, adhered, and/or otherwise positioned to cover at least one surface of the substrate 102 and/or film layer 104 using various techniques as desired. As a non-limiting example, the metallic layer 306 may be printed on, adhered to, vapor-deposited, or the like. In some embodiments, the metallic layer 306 is plated on the substrate 102 or film layer 104, sputtered on the substrate 102 or film layer 104, or the like. In various embodiments, a metallic foil layer is adhered to the substrate 102 and/or film layer 104.

In some embodiments, the metallic layer 306 may form an outer-most layer of the fabric or flexible composite material 300. However, in other embodiments, it need not be, and the metallic layer 306 may be covered by an exterior layer (and the exterior layer is an outer-most layer). When included, the exterior layer may be various types of materials as desired, and in certain embodiments the exterior layer may protect the metallic layer 306. In one non-limiting example, the exterior layer may be an acrylic coating, although in other embodiments other suitable materials may be utilized as desired. Optionally, and when included, the exterior layer may include a thin film layer, coating, or other suitable layer that may minimize and/or prevent damage, oxidation, and/or corrosion of the metallic layer 306. In some embodiments, the metallic layer 306 is covered by an exterior layer to prevent or minimize deterioration of the fabric or flexible composite material due to hydrolysis. In various embodiments, the metallic layer 306 is covered by an exterior layer to promote adhesion to seam tapes, girt materials, floor materials, sliding surface materials, patch materials, accessory materials, component materials, or other materials or components. In various embodiments, the metallic layer 306 is covered by an exterior layer to increase the durability of the metallic layer, fabric, or flexible composite material.

In some embodiments, the exterior layer optionally includes a passivation layer, a parkerized layer, or other suitable layer that may be formed via a controlled oxidation process.

In various aspects, when included, the metallic layer 306 reduces the emissivity of the fabric or flexible composite material 100 to less than or equal to 0.48, such as less than or equal to 0.25. In a non-limiting example, for substrates with a higher melting temperature than polyethylene, an emissivity of 0.48 or lower is sufficient, and substrates with a melting temperature like polyethylene or lower may include an emissivity of 0.25 or less. The reduced emissivity in turn may limit the temperature that the fabric or flexible composite material 300 is heated to when the fabric or flexible composite material 300 is exposed to radiant heat. As a non-limiting example, the metallic layer 306 may limit the temperature an ultra-high molecular weight polyethylene substrate to about 199° F., or about 98° F. less than the melting temperature of the ultra-high molecular weight polyethylene substrate.

The aforementioned fabric or flexible composite materials are for illustrative purposes only. In other embodiments, fabrics or flexible composite materials for inflatable safety products may have substrates and film layer(s) with the same base polymer but different configurations as desired.

FAA Requirements

In various embodiments, the fabric or flexible composite material described herein may meet and/or exceeds the fabric or flexible composite material requirements according to TSO-C69c from the Federal Aviation Administration (FAA), entitled EMERGENCY EVACUATION SLIDES, RAMPS, RAMP/SLIDES, AND SLIDE RAFTS and published Aug. 18, 1999 ("TSO-C69c") (incorporated herein by reference), TSO-C13f from the FAA, entitled LIFE PRESERVERS and published Sep. 24, 1992 ("TSO-C13f") (incorporated herein by reference), and/or TSO-C70b from the FAA, entitled LIFE RAFTS and published Aug. 4, 2014 ("TSO-C70b") (incorporated herein by reference).

Required tests include: seam peel strength, seam shear strength, tensile strength (grab test), tear strength (trapezoid test), tear strength (tongue test), ply adhesion, coat adhesion, temperature resistance, radiant heat resistance, puncture strength, tear propagation, chafe resistance, flammability (vertical burn rate), pressure retention, permeability, porosity (hydrolysis), hydrolysis conditioning, resistance to hydrolysis, fluids exposure, and accelerated aging.

Seam Adhesion

TSO-C69c Requirement

As a non-limiting example, the fabric or flexible composite material adhered or welded to the fabric or flexible composite material of the inflatable safety product creating a seam region, when separated from the fabric or flexible composite material of the inflatable safety product, at or about a 180° angle, at a separation rate of between 2 and 2.5 inches/minute, at a temperature between 70° F. to 72° F., wherein the average of at least 5 specimens must resist separation with a force of 5 pounds/inch width or greater. The aforementioned resistance to separation, described herein peel strength as referenced in TSOs, such as but not limited to TSO-C69c from the FAA.

As a further non-limiting example, any coatings, films, or layers applied to the substrate of the fabric or flexible composite material, when separated from the substrate or other layers used in the construction of the fabric or flexible composite material, of the inflatable safety product, at or about a 180° angle, at a separation rate of between 2 and 2.5 inches/minute, at a temperature of between 70° F. to 72° F., wherein the average of at least 5 specimens must resist separation with a force of 5 pounds/inch width or greater. The aforementioned resistance to separation, described herein ply adhesion and coating adhesion as referenced in TSOs, such as but not limited to TSO-C69c from the FAA.

Seam Shear

TSO-C69c Requirement

As a non-limiting example, the fabric or flexible composite material adhered or welded to the fabric or flexible composite material of the inflatable safety product creating a seam region, when used to create a specimen of the seam region and with the fabric or flexible composite material adhered or welded with a ¾ inch maximum overlap, at a separation rate between 11.5 and 12.5 inches/minute, at a temperature of 75° F., wherein the average of at least 3 specimens must resist separation with a force of 175 pounds/inch width or greater when pulled in the shear direction.

As a further non-limiting example, the fabric or flexible composite material adhered or welded to the fabric or flexible composite material of the inflatable safety product creating a seam region, when used to create a specimen of seam region 2 inches in length and with the fabric or flexible composite material adhered or welded at a ¾ inch maximum overlap, at a separation rate of between 11.5 and 12.5 inches/minute, at a temperature of 140° F., wherein the average of at least 3 specimens must resist separation with a force of 40 pounds/inch width or greater when the pulled in the shear direction. The aforementioned resistance to separation, describes shear strength as referenced in TSOs, such as but not limited to TSO-C69c from the FAA.

Tensile and Tear Strength

TSO-C69c Requirement

As a non-limiting example, the fabric or flexible composite material of the inflatable safety product, when at least 5 specimens prepared as per Federal Test Method Standard-Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard-Method 5136 (Trapezoid Test), are placed between 2 jaws that are 1 inch apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging (exposed to a temperature of 158±4° F. for not less than 168 hours), the fabric or flexible composite of the inflatable safety product, when at least 5 specimens prepared as per Federal Test Method Standard-Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must resist separation with a maximum force of an average of at least 190 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must a resist separation with a maximum force of an average of at least 190 pounds/inch in warp direction and fill direction (along the manufacturing length and width of the fabric or flexible composite material).

Air Holding & Gas Holding
TSO-C69c Requirement

As a non-limiting example, the fabric or flexible composite material, described herein when configured into an inflatable safety product must withstand a pressure of at least 1.5 times the maximum operating pressure for at least 5 minutes of its intended use.

As a further non-limiting example, the fabric or flexible composite material, described herein when configured into an inflatable safety product must withstand a pressure of at least 2 times the maximum operating pressure for at least 1 minute, of its intended use.

As a further non-limiting example, the fabric or flexible composite material, described herein when configured into an inflatable safety inflatable safety product, when inflated to its operating pressure of intended use must not fall below at least 50 percent of its initial pressure in a period less than 12 hours.

As a further non-limiting example, the fabric or flexible composite material, described herein when configured into an inflatable safety product, that is capable of being used as a life raft or flotation device when inflated to its operating pressure of intended use must not fall below the minimum raft mode operating pressure in less than 24 hours.

Helium Permeability
TSO-C69c Requirement

As a non-limiting example, the fabric or flexible composite material of the inflatable safety product, when at least 3 specimens are prepared and tested as per Federal Test Method Standard—Method 5460 or ASTM Method D1434-82, Procedure V, have a maximum permeability of Helium of 10 liters per square meter in 24 hours at 77° F. or its equivalent in Hydrogen when a pressure is applied to the chamber on the side of the test specimen that separates the test gas (Helium or its equivalent in Hydrogen) from the chamber receiving the permeating gas.

Temperature Resistance
TSO-C69c Requirement:

As a non-limiting example, the fabric or flexible composite material, seam tape, accessory material and or product accessories described herein when exposed to temperatures from −40° F. to 160° F. must remain fully functioning per its intended use as referenced in TSOs, such as but not limited to TSO-C69c from the FAA.

As a further non-limiting example, the fabric or flexible composite material, seam tape, accessory material and or product accessories described herein must remain fully functioning per its intended use after exposure to a storage temperature of 185° F. or greater as referenced in TSOs, such as but not limited to TSO-C69c from the FAA.

As a further non-limiting example, the fabric or flexible composite material, seam tape, accessory material and or product accessories described herein must remain fully functioning per its intended use after being stowed at a temperature −65° F. or less as referenced in TSOs, such as but not limited to TSO-C69c from the FAA.

Radiant Heat Resistance
TSO-C69c Requirement

As a further non-limiting example, the fabric or flexible composite material described herein when exposed to a radiant heat flux of 1.5 Btu/ft$^2$-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Fluids Exposure
TSO-C70b Requirement

As a further non-limiting example, the fabric or flexible composite material described herein must be capable of withstanding the detrimental effects of exposure to fuels, oils, hydraulic fluids, and sea water. After being exposed to fuels, oils, hydraulic fluids, and sea water, a seam will not have a decrease in seam strength or coat adhesion of more than 10%.

As a further non-limiting example, the fabric or flexible composite material, described herein must remain capable of withstanding the detrimental effects of exposure to fuels, oils, hydraulic fluids, and sea water with no loss in air holding or gas holding properties. After being exposed to fuels, oils, hydraulic fluids, and sea water, the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C70b from the FAA.

Hydrolysis
TSO-C69c Requirement

As a further non-limiting example, the fabric or flexible composite material, described herein must remain capable of withstanding the detrimental effects of hydrolysis exposure to a temperature of 136±4° F. at a relative humidity of 95±4 percent for a period of 50 days with no loss in air holding or gas holding properties. After hydrolysis exposure to a temperature of 136±4° F. at a relative humidity of 95±4 percent for a period of 50 days the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 20% as referenced in TSOs, such as but not limited to TSO-C69c from the FAA.

Tear Propagation

TSO-C69c Requirement

As a non-limiting example, the fabric or flexible composite material, described herein when must not allow a tear to propagate beyond the implement that caused an initial puncture or tear as referenced in TSOs, such as but not limited to TSO-C69c from the FAA.

Accelerated Aging

TSO-C69c Requirement

As a further non-limiting example, the fabric or flexible composite material, described herein must remain capable of withstanding the detrimental effects of accelerated aging at a temperature of 158±4° F. for not less than 168 hours with no loss in air holding or gas holding properties. After accelerated aging at a temperature of 158±4° F. for not less than 168 hours the fabric or flexible composite material, seam tape, accessory material wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C69c from the FAA.

Flammability

TSO-C69c Requirement

As a non-limiting example, the fabric or flexible composite material, described herein, wherein the average of at least 3 specimens in warp direction and fill direction (along the manufacturing length and width of the fabric or flexible composite material material) are located ¾ inches above the top edge of a burner apparatus, for a period of 12 seconds is exposed to a flame with a total length of 1.5 inches and an inner cone length of ⅞ inches, and minimum temperature of 1550° F., shall not burn for more than 15 seconds after the flame is removed, shall not burn more than 8 inches in the vertical direction, wherein any material that drips form the specimen shall not burn to more than 5 seconds, as referenced such as but not limited to the flammability requirements of 14 CFR part 25.853(a), Appendix F, Part I (a)(1)(ii) as referenced in TSOs, such as but not limited to TSO-C69c from the FAA.

EXAMPLES

A collection of exemplary embodiments is provided below, including at least some explicitly enumerated as "Examples" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Example 1. A fabric or flexible composite material for an inflatable safety product, the fabric or flexible composite material comprising a substrate and a film covering a surface of the substrate, wherein the substrate and the film comprise a same base polymer.

Example 2. The fabric or flexible composite material of any of the preceding or subsequent examples or combination of examples, wherein a melting temperature of the film is different from a melting temperature of the substrate.

Example 3. The fabric or flexible composite material of any of the preceding or subsequent examples or combination of examples, wherein the melting temperature of the film is less than the melting temperature of the substrate.

Example 4. The fabric or flexible composite material of any of the preceding or subsequent examples or combination of examples, wherein the same base polymer comprises polyethylene.

Example 5. The fabric or flexible composite material of any of the preceding or subsequent examples or combination of examples, wherein the same base polymer comprises polyethylene, ultra-high molecular weight polyethylene, polypropylene, polyester, polyamide, aromatic polyamide, aramid, polyolefin, aromatic polyester, polyarylate, other liquid crystal polymers, or nylon.

Example 6. The fabric or flexible composite material of any of the preceding or subsequent examples or combination of examples, wherein the fabric or flexible composite material of claim 1 is an adhesive-free fabric or flexible composite material.

Example 7. The fabric or flexible composite material of any of the preceding or subsequent examples or combination of examples, wherein the film is fused to the substrate.

Example 8. The fabric or flexible composite material of any of the preceding or subsequent examples or combination of examples, wherein the film is an outer film covering the substrate or an inner film covering the substrate.

Example 9. The fabric or flexible composite material of any of the preceding or subsequent examples or combination of examples, wherein the film is a first film of a plurality of films, each film of the plurality of films comprising the same base polymer, and wherein at least one film of the plurality of films is covering a surface of the substrate.

Example 10. The fabric or flexible composite material of any of the preceding or subsequent examples or combination of examples, wherein the film is a first film of a plurality of films, each film of the plurality of films comprising the same base polymer, and wherein at least one film of the plurality of films is an outer film covering the substrate and at least one film of the plurality of films is an inner film covering the substrate.

Example 11. The fabric or flexible composite material of any of the preceding or subsequent examples or combination of examples, wherein the fabric or flexible composite material comprises a tensile strength of at least 190 lbs/in and a tear strength of at least 13 lbs/in.

Example 12. The fabric or flexible composite material of any of the preceding or subsequent examples or combination of examples, wherein the fabric or flexible composite material comprises a fabric or flexible composite material weight less than 8 ounces/yd$^2$.

Example 13. The fabric or flexible composite material of any of the preceding or subsequent examples or combination of examples, wherein the fabric or flexible composite material comprises an emissivity value of 0.48 or less.

Example 14. The fabric or flexible composite material of any of the preceding or subsequent examples or combination of examples, wherein the substrate defines a surface, and wherein the fabric or flexible composite material further comprises a metallic layer at least partially covering the surface.

Example 15. The fabric or flexible composite material of any of the preceding or subsequent examples or combination of examples, wherein the metallic layer completely covers the surface.

Example 16. The fabric or flexible composite material of any of the preceding or subsequent examples or combination of examples, wherein the metallic layer comprises aluminum, an aluminum alloy, titanium, a titanium alloy, nickel, a nickel alloy, brass, a brass alloy, steel, a steel alloys, stainless steel or a stainless steel alloy, silver, a silver alloy, combinations thereof, or any other suitable metal or metallic alloy.

Example 17. The fabric or flexible composite material of any of the preceding or subsequent examples or combination of examples, wherein the metallic layer is adhered to the film or the substrate.

Example 18. The fabric or flexible composite material of any of the preceding or subsequent examples or combination of examples, wherein the fabric or flexible composite material comprises a radiant heat resistance of at least 180 seconds.

Example 19. The fabric or flexible composite material of any of the preceding or subsequent examples or combination of examples, wherein the fabric or flexible composite material when exposed to a radiant heat flux of 1.5 Btu/ft$^2$-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Example 20. The fabric or flexible composite material of any of the preceding or subsequent examples or combination of examples, wherein the fabric or flexible composite material is a gas-holding fabric or flexible composite material, a seam tape fabric or flexible composite material, a floor fabric or flexible composite material, a sliding surface fabric or flexible composite material, a girt fabric or flexible composite material, a patch fabric or flexible composite material, a handle fabric or flexible composite material, a pouch fabric or flexible composite material, a container fabric or flexible composite material, a structural attachment fabric or flexible composite material, an accessory fabric or flexible composite material, or a component fabric or flexible composite material.

Example 21. An inflatable safety product comprising the fabric or flexible composite material of any of the preceding or subsequent examples or combination of examples as a panel, gas-holding fabric, seam tape, floor, sliding surface, girt, patch, handle, pouch, container, structural attachment, accessory, or as a component.

Example 22. The inflatable safety product of any of the preceding or subsequent examples or combination of examples, wherein the inflatable safety product comprises an inflatable evacuation slide, inflatable evacuation slide/raft, inflatable evacuation ramp, or inflatable evacuation slide/ramp, life raft, life vest, or helicopter float.

Example 23. A fabric or flexible composite material for an inflatable safety product, the fabric or flexible composite material comprising a substrate and a film covering a surface of the substrate, wherein the film is fused to the substrate without an adhesive.

Example 24. The fabric or flexible composite material of any of the preceding or subsequent examples or combination of examples, wherein the substrate and the film comprise a same base polymer.

Example 25. The fabric or flexible composite material of any of the preceding or subsequent examples or combination of examples, wherein the film is a first film of a plurality of films, wherein at least one film of the plurality of films comprises a same base polymer as the substrate, and wherein at least one film of the plurality of films is covering a surface of the substrate.

Example 26. The fabric or flexible composite material of any of the preceding or subsequent examples or combination of examples, wherein the film is a first film of a plurality of films, at least one film of the plurality of films comprising a same base polymer, and wherein at least one film of the plurality of films is an outer film covering a surface of the substrate and at least one film of the plurality of films is an inner film covering a surface of the substrate.

Example 27. The fabric or flexible composite material of any of the preceding or subsequent examples or combination of examples, wherein the film is a first film of a plurality of films, wherein at least one film of the plurality of films comprises a base polymer that is different from a base polymer of the substrate.

Example 28. The fabric or flexible composite material of any of the preceding or subsequent examples or combination of examples, wherein the substrate defines a surface, and wherein the fabric or flexible composite material further comprises a metallic layer at least partially covering the surface.

Example 29. A method of forming an inflatable safety product, the method comprising forming a fabric or flexible composite material by fusing a film to a substrate without an adhesive.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. A fabric or flexible composite material for an inflatable safety product, the fabric or flexible composite material comprising:
   a substrate comprising a first base polymer; and
   a film comprising a second base polymer and covering a surface of the substrate, wherein the first base polymer and the second base polymer are identical, wherein the fabric or flexible composite material comprises a tensile strength of at least 190 lbs/in and a tear strength of at least 13 lbs/in, wherein a pressure applied to a first portion of the surface that is opposite a heat source does not decrease for at least 90 seconds when the first portion is subjected to a higher pressure than a second portion of the surface that is not subjected to the heat source, and wherein an average of a time to pressure decrease of at least 3 specimens of the fabric or flexible composite is at least 180 seconds or greater when exposed to a radiant heat flux of 1.5 Btu/ft$^2$-sec or greater.

2. The fabric or flexible composite material of claim 1, wherein the first base polymer and the second base polymer each comprise polyethylene.

3. The fabric or flexible composite material of claim 1, wherein the first base polymer and the second base polymer each comprise polyethylene, ultra-high molecular weight polyethylene, polypropylene, polyester, polyamide, aromatic polyamide, aramid, polyolefin, aromatic polyester, polyarylate, liquid crystal polymers, or nylon.

4. The fabric or flexible composite material of claim 1, wherein the fabric or flexible composite material is an adhesive-free fabric or flexible composite material.

5. The fabric or flexible composite material of claim 1, wherein the film is fused to the substrate.

6. The fabric or flexible composite material of claim 1, wherein the film is an outer film covering the substrate, and wherein the substrate does not have an inner film.

7. The fabric or flexible composite material of claim 1, wherein the film is a first film of a plurality of films, each film of the plurality of films comprising the second base polymer, and wherein at least one film of the plurality of films is covering a surface of the substrate.

8. The fabric or flexible composite material of claim 1, wherein the film is a first film of a plurality of films, each film of the plurality of films comprising the second base polymer, and wherein at least one film of the plurality of films is an outer film covering the substrate and at least one film of the plurality of films is an inner film covering the substrate.

9. The fabric or flexible composite material of claim 1, wherein the fabric or flexible composite material comprises a fabric or flexible composite material weight less than 8 ounces/yd$^2$.

10. The fabric or flexible composite material of claim 1, wherein the fabric or flexible composite material comprises an emissivity value of 0.48 or less.

11. The fabric or flexible composite material of claim 1, wherein the substrate defines a surface, and wherein the fabric or flexible composite material further comprises a metallic layer at least partially covering the surface.

12. The fabric or flexible composite material of claim 11, wherein the metallic layer completely covers the surface.

13. The fabric or flexible composite material of claim 11, wherein the metallic layer comprises aluminum, an aluminum alloy, titanium, a titanium alloy, nickel, a nickel alloy, brass, a brass alloy, steel, a steel alloy, stainless steel or a stainless steel alloy, silver, a silver alloy, or combinations thereof.

14. The fabric or flexible composite material of claim 11, wherein the metallic layer is adhered to the film or the substrate.

15. The fabric or flexible composite material of claim 1, wherein the fabric or flexible composite material is a gas-holding fabric or flexible composite material, a seam tape fabric or flexible composite material, a floor fabric or flexible composite material, a sliding surface fabric or flexible composite material, a girt fabric or flexible composite material, a patch fabric or flexible composite material, a handle fabric or flexible composite material, a pouch fabric or flexible composite material, a container fabric or flexible composite material, a structural attachment fabric or flexible composite material, an accessory fabric or flexible composite material, or a component fabric or flexible composite material.

16. An inflatable safety product comprising the fabric or flexible composite material of claim 1 as a panel, gas-holding fabric, seam tape, floor, sliding surface, girt, patch, handle, pouch, container, structural attachment, accessory, or as a component.

17. The inflatable safety product of claim 16, wherein the inflatable safety product comprises an inflatable evacuation slide, inflatable evacuation slide/raft, inflatable evacuation ramp, or inflatable evacuation slide/ramp, life raft, life vest, or helicopter float.

18. A fabric or flexible composite material for an inflatable safety product, the fabric or flexible composite material comprising;
a substrate comprising a first base polymer; and
a film comprising a second base polymer and covering a surface of the substrate, wherein the first base polymer and the second base polymer are identical, wherein the film is fused to the substrate without an adhesive, wherein the fabric or flexible composite material comprises a tensile strength of at least 190 lbs/in and a tear strength of at least 13 lbs/in, wherein a pressure applied to the surface opposite a heat source does not decrease for at least 90 seconds when the surface opposite the heat source is subjected to a higher pressure than the surface subjected to the heat source, and wherein an average of a time to pressure decrease of at least 3 specimens of the fabric or flexible composite is at least 180 seconds or greater when exposed to a radiant heat flux of 1.5 Btu/ft$^2$-sec or greater.

19. The fabric or flexible composite material of claim 18, wherein the film is a first film of a plurality of films, wherein at least one film of the plurality of films comprises the second base polymer, and wherein at least one film of the plurality of films is covering a surface of the substrate.

20. The fabric or flexible composite material of claim 18, wherein the film is a first film of a plurality of films, at least one film of the plurality of films comprising the second base polymer, and wherein at least one film of the plurality of films is an outer film covering a surface of the substrate and at least one film of the plurality of films is an inner film covering a surface of the substrate.

21. The fabric or flexible composite material of claim 18, wherein the film is a first film of a plurality of films, wherein at least one film of the plurality of films comprises a base polymer that is different from the first base polymer.

22. The fabric or flexible composite material of claim 18, wherein the substrate defines a surface, and wherein the fabric or flexible composite material further comprises a metallic layer at least partially covering the surface.

23. A method of forming an inflatable safety product, the method comprising forming a fabric or flexible composite material by fusing a film to a substrate without an adhesive, wherein the substrate comprises a first base polymer that is identical to a second base polymer of the film, wherein the fabric or flexible composite material comprises a tensile strength of at least 190 lbs/in and a tear strength of at least 13 lbs/in, wherein a pressure applied to a surface opposite a heat source does not decrease for at least 90 seconds when the surface opposite the heat source is subjected to a higher pressure than the surface subjected to the heat source, and wherein an average of a time to pressure decrease of at least 3 specimens of the fabric or flexible composite is at least 180 seconds or greater when exposed to a radiant heat flux of 1.5 Btu/ft$^2$-sec or greater.

* * * * *